May 26, 1970 C. W. EHRMAN 3,514,761

ACCESS CONTROL FOR MEMORY ADDRESSES

Filed Jan. 2, 1968

INVENTOR
CARL W. EHRMAN

BY Alfred E Hall
ATTORNEY

United States Patent Office 3,514,761
Patented May 26, 1970

3,514,761

ACCESS CONTROL FOR MEMORY ADDRESSES

Carl W. Ehrman, Minneapolis, Minn., assignor to Sperry Rand Corporation, New York, N.Y., a corporation of Delaware Filed Jan. 2, 1968, Ser. No. 695,100
Int. Cl. G06f *1/00*
U.S. Cl. 340—172.5 4 Claims

ABSTRACT OF THE DISCLOSURE

A circuit including a free-running counter for address precession forward or backward to control access to continuously cycled memory addresses such as in a CRT display where display regeneration requires continuous memory cycling.

BACKGROUND OF THE INVENTION

Memories or data storage devices are used to a great extent in the data processing industry of today. In many applications the memory addresses must be continually cycled and, therefore, access control becomes a very important problem. Such applications include rotating drum memories and cathode ray tube display systems wherein display regeneration requires continuous memory cycling.

In commonly assigned copending application to Granberg et al. having Ser. No. 436,174 and entitled "Digital Data CRT Display System" which was filed Mar. 1, 1965 there is disclosed a system wherein continuous memory cycling is required.

In that system the electron beam is positioned in any one of its locations on the screen, 512 for example, by the digital address stored in an Electromagnetic Address Register which controls the magnetic deflection coils of the CRT. A particular character is "painted" or traced on the face of the CRT by the digital data stored in an Electrostatic Address Register which controls the electrostatic deflection plates of the CRT. It is to be understood that wherever the word "painted" is used hereinafter, it is to be used interchangeably with the word "traced."

The display unit contains a 512 word, 6 bit, core memory. However, this is not intended to be limiting but is for purposes of example only and may include larger or smaller memories. It is loaded by a standard computer output channel, a keyboard associated with the display unit (which is similar to a standard electric typewriter keyboard), any special type keyboard, or any special input switch arrangement. These inputs are in the form of data words up to six bits in length which are stored in the 512 word core memory.

As the electromagnetic beam positioning circuitry causes the beam to assume consecutively the 512 positions on the face of the tube, 16 lines with 32 characters per line, it also causes the stored information in the 512 corresponding locations in the core to be consecutively read out. The character repertoire is stored in a diode matrix array which may consist, for instance, of an 8 by 8 array of character synthesizing matrices which would allow 64 different characters to be stored in the matrix array. As each 6 bit word is read out of memory, it causes selection of one character synthesizing matrix as defined by the junction of a row and column in the matrix array. The output of any one of the matrices in the diode matrix array is in digital form and is coupled to the Electrostatic Address Register where it controls the electron beam to trace the desired character. If more than 64 characters are used, then the memory must use more bits for character length, i.e. 7 bits for 64 to 128 or 8 bits for 129 to 256 characters.

The Electro-Magnetic Beam Control includes an M-register which stores digital information which positions the election beam both vertically and horizontally in any one of its 512 positions. The beam continually performs a scanning action which consists of scanning along the 32 positions in the first row, dropping to the second row and scanning through the next 32 positions, dropping to the third row, etc., continuing on through row 16 and the 32 positions therein and then returning to position 1 of line 1. The digital information in the M-register which represents the beam position is transferred to an S-register as the address of the data existing in the memory at that location to be read out to a Z-register for "painting" during the painting cycle. The digital information in the S-register is then transferred to an R-register. Any information coupled into the R-register is automatically incremented by 1 count. Thus, the data in the S-register is incremented by 1 in the R-register and transferred back to the M-register to cause the beam to assume the next successive position. This cycle continues causing the beam to perform the scanning action described above. The above actions all take place during what is called the "painting" cycle.

There is also involved with the above system an I/O cycle which enables any character identifying signals from a keyboard, computer or other input source to be stored in the appropriate location in the memory.

Involved in the I/O circuitry is an X-register which contains in digital form the location on the CRT screen at which the next character is to be painted as indicated by a cursor. Thus, each time a keyboard key representing a character is depressed, the data in the X-register is transferred to the S-register and the input data is stored in the memory at that location. The data in the S-register is then transferred to the R-register where it is incremented by 1 and returned to the X-register. This cycle is repeated each time an input character is to be stored in the memory.

Thus, it will be seen that during the painting cycle, the data stored in the M-register indicates the beam position on the face of the CRT. This data is transferred to the S-register where it causes data in the memory at a corresponding location to be read out and initiates operations for painting the desired character on the face of the CRT. The data in the S-register is then transferred to the R-register where it is incremented by one count and returned to the M-register. During each 16 microsecond painting cycle, the above operations take place.

During the 16 microsecond I/O cycle following each painting cycle, data input to the device from the keyboard, the computer or the external switch arrangement is stored in the memory at the location determined by the address in the X-register. The data input also produces a signal which causes the data stored in the S-register to be transferred to the R-register where it is incremented by one count and returned to the X-register. The incremented data in the X-register causes the cursor to step to the right one position to enable the next input character to be "entered" there during the next I/O cycle.

SUMMARY OF THE INVENTION

While the system described in the above identified, commonly assigned, copending application performs in a remarkable fashion at high speeds, there exists situations where speed is not critical and, therefore, a more simple means for controlling data insertions into a continuously cycling memory is needed.

The present invention satisfies the above criteria. The invention eliminates the need for a separate address counter to control I/O access, i.e. the insertion of new data into the memory or the modification of old data via the keyboard.

The circuitry comprises a counter, for sequentially producing pairs of memory address words, and a data storage register. The data storage register stores information representing the location in memory that is to be accessed for data insertion. The first signal of each pair of signals produced by the counter represents the memory location presently being scanned. The second signal in the pair represents the memory location succeeding the location being scanned.

When data is to be stored in the memory, it will be stored at the location determined by the data in the storage register. Thus, as the electron beam scans the character locations on the CRT screen it will ultimately reach the location represented by the data in the storage register. When the said first signal and the said data in the storage register compare, and if a memory access signal is present representing that a data signal is to be stored, a comparator produces a signal which stores the data in the memory at the location being scanned which, at that time, is the location represented by the data stored in the storage register.

If a backspace is desired, a backspace key is depressed which produces a backspace signal. If this signal is present, when the second signal from the counter (representing the memory location succeeding the location being scanned) compares with the data in the storage register, a comparator produces a signal which causes the first signal in the counter (representing the memory location presently being scanned) to be stored in the storage register. At this instant, said first signal is one memory position behind the data previously stored in the storage register and, thus, any data to be stored will now be stored in the memory at a location one space behind where it would normally be stored.

Thus with just a counter and one register, the memory access signal produced when data is to be entered into memory will cause a normal increment of the data in the storage register while a backspace signal will cause the data in the storage register to be decremented one space.

BRIEF DESCRIPTION OF THE DRAWINGS

For a more complete understanding of the invention, the inventive aspects will be disclosed in the course of the following specification, reference being had to be accompanying drawings, in which.

DESCRIPTION OF THE PREFERRED EMBODIMENT

As stated above, the present invention can be used in any application where the memory addresses must be continually cycled. For a better understanding of the invention, the following discussion will relate the address precession circuit to a cathode ray tube display system. However, the invention is not intended to be limited thereto.

Figure 1:
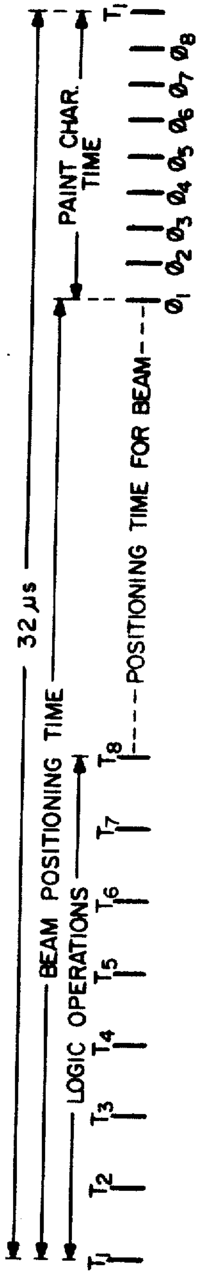
FIG. 1 is a timing diagram illustrating the timing of the operations involved in the present invention.

As shown in the timing chart in FIG. 1, in a 32 microsecond time interval the electron beam is positioned and then the selected character is "painted" or traced on the screen. During the portion of the cycle allotted for positioning the beam, logic operations are performed which initiate the beam positioning and which control the logic for accessing the memory.

At time $T_1$, the beam positioning register (M-register) receives data from the R-register representing the next succeeding beam position. The beam begins to move to this succeeding position.

At time $T_2$, while the beam is still moving towards its next succeeding position, the data in the M-register is incremented by one count and stored back in the R-register.

The S-register stores the data representing the location in Memory to be accessed when new data from some source such as a keyboard is to be entered into the Memory. Assuming that such data is to be entered into the Memory and a Sprocket pulse is present indicating that the new data is on the input lines, and assuming also that prior to time $T_1$ the beam had moved such that when the data was stored therein at time $T_1$ the contents of the M-register now equalled the data in the S-register, then a comparator produces a signal representing such equality and the comparator signal, the Sprocket signal and a timing pulse $T_3$ SETS a flip-flop known as the Character Input F/F. The output of the flip-flop will gate any data on the input lines into the stages of the Z-register the output of which actuates the character generating circuits.

At time $T_4$, the output of the Character Input F/F will gate the contents of the R-register (M-register +1) into the S-register to cause the cursor, an indicator to visually show where the next character is to be entered on a cathode ray tube screen, to move one step ahead in the next cycle, not the present one.

If the backspace key has been depressed, at time $T_4$ the contents of the M-register will be gated into the S-register to cause the cursor to move one step backward in the next cycle.

At time $T_5$, if no character key has been depressed, data is read out of Memory to the Z-register the output of which actuates the character generating circuits. If a character key has been depressed, the Character Input F/F is SET as explained above which produces an output that inhibits the read out circuits.

At time $T_6$, the contents of the Z-register, whether it be new input data or data read out of Memory, is now written back into Memory at the location specified by the data in the M-register.

At time $T_7$, if the Character Input F/F has been SET, it produces an output that CLEARS the Data registers, the Backspace F/F and the Sprocket F/F.

At time $T_8$, the Character Input F/F is CLEARED and the circuit is ready to begin a new cycle. However, the new cycle will not begin at this time since the electron beam is still attempting to position itself in the location specified by the data stored in the M-register at time $T_1$. After the beam has positioned itself in the required location, then time must be given for the character to be "painted" or traced. If the character generation circuits used are those described in the above identified copending application, time must be allowed for 8 phases to produce 8 strokes which form a character.

Figure 2:
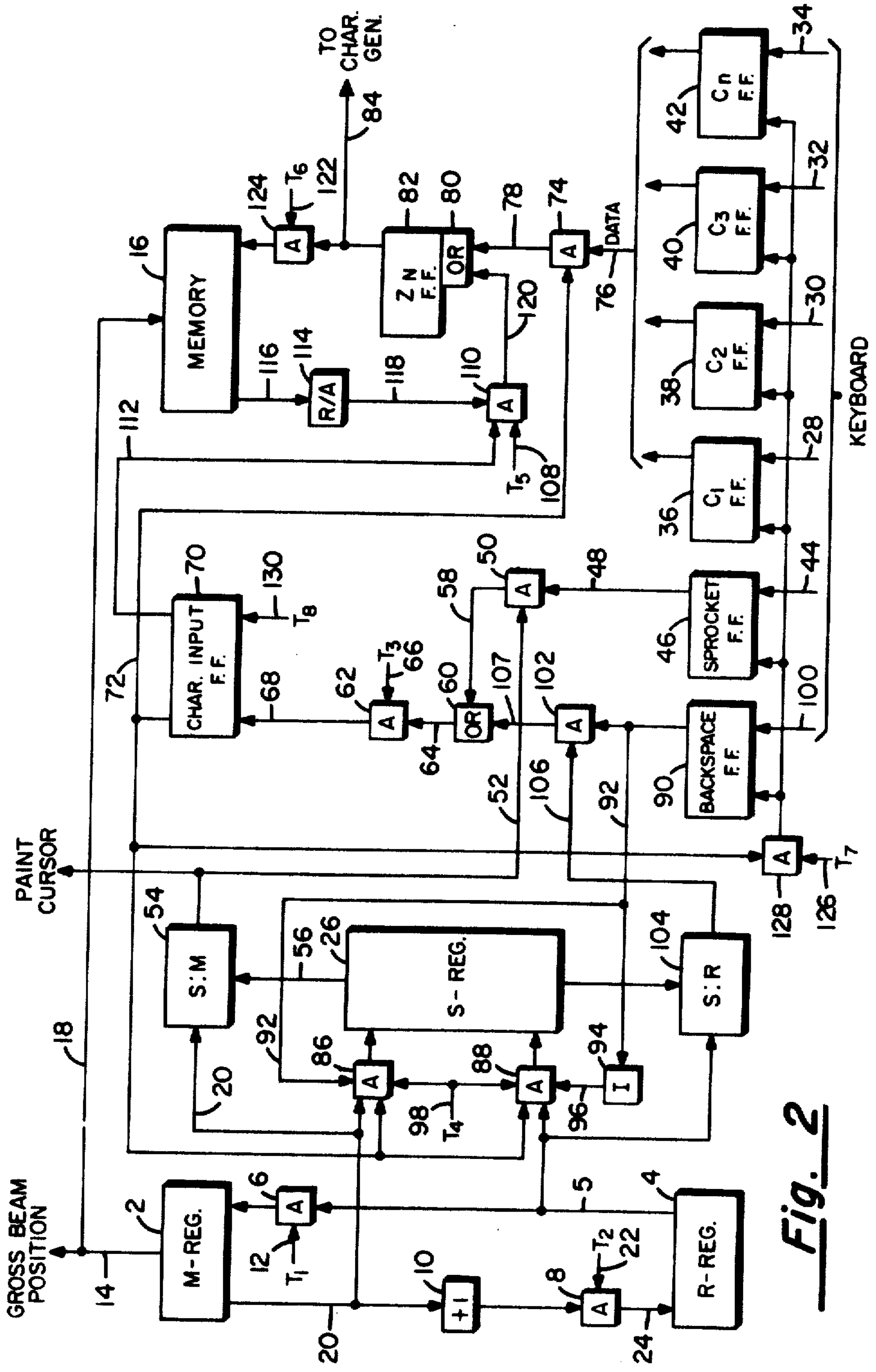
FIG. 2 is a circuit diagram of the address precession circuit.

Consider now FIG. 2 which discloses the circuitry of the present invention.

M-register 2 and R-register 4 with associated AND gates 6 and 8 and incrementing circuit 10 from a Counter which causes the electron beam to successively step through every position on the cathode ray tube screen while at the same time accessing the corresponding locations in Memory to cause data to be read out of and/or written into that particular location in Memory.

Assuming the data in the M-register to represent the *i*th location in Memory (and on the cathode ray tube screen), and the data in the R-register to represent the *i*th+1 location, then at time $T_1$, the timing signal on line 12 coupled to AND gate 6 causes the data in the R-register 4 on line 5 to be transferred to the corresponding stages of the M-register 2 and thus the M-register has been incremented and the output on line 14 causes the electron beam to begin to move to that new position. It also accesses Memory 16 via line 18.

The new data in the. M-register is also coupled to incrementing unit 10 via line 20. Unit 10 increments the data on line 20 by one count and couples it as one input to AND gate 8. When timing pulse $T_2$ is present on line 22, AND gate 8 is enabled and it couples the incremented data from Unit 10 to the corresponding stages of the R-register 4 via line 24.

This cycle repeats itself each time pulses $T_1$ and $T_2$ occur and, thus, the counter sequentially produces pairs of memory address words on lines 14 and 5 representing first and second memory addresses respectively. The address on line 14 represents the present beam position and the present memory location being accessed while the address on line 5 represents the next succeeding beam position and the next succeeding memory location to be accessed provided that the backspace key has not been depressed. If the backspace key has been depressed, the data in the R-register 4 on line 5 is compared with the data in S-register 26 which represents the next memory position to be accessed. When the compare exists, data from M-register 2 is gated into the S-register 26 to cause a backspace operation.

When a keyboard data key is depressed, the coded digital signals present on lines 28–34 are stored in stages 36–42 respectively of the C-register. Also, whenever a keyboard data key is depressed a sprocket signal is produced on line 44 which is stored in Sprocket Flip-flop 46 and causes an output from flip-flop 46 on line 48. This signal is coupled to AND gate 50 as one input. The other input to AND gate 50 on line 52 is from comparator 54. This comparator is coupled to M-register 2 via line 20 and to S-register 26 via line 56. When these two registers have data that compare comparator 54 produces an output on line 52 which indicates that the beam has now reached the position at which new data may be inserted in the Memory 16. AND gate 50 therefore produces a signal on line 58 that is coupled to and passes through OR gate 60 and is coupled to AND gate 62 via line 64.

When timing pulse $T_3$ is present on line 66, AND gate 62 produces an output on line 68 that SETS Character Input F/F 70. The output of Character Input F/F 70 on line 72 is coupled to AND gate 74 which also receives the output of the stages of the C-register via cable 76. AND gate 74 is thus enabled and transfers the data in the C-register via cable 78 through OR gate 80 to the appropriate stages of the Z-register (represented as one stage 82). The output of the Z-register on line 84 is used to select the proper character generating network.

The output of the Character Input F/F 70 on line 72 is also coupled to AND gates 86 and 88. And gate 86 also has as an input the data from the M-register 2 on line 20. AND gate 88 has as another input the data from the R-register 4 on line 5. If the backspace key has not been depressed, there is no signal from Backspace F/F 90 on line 92 which is coupled to AND gate 86. Since line 92 is also coupled to Inverter 94 and no signal is present on line 92, Inverter 94 produces an output on line 96 which is coupled to AND gate 88.

At time $T_4$, a timing pulse is present on line 98 which is coupled to both AND gates 86 and 88. AND gate 86 cannot conduct since there is no backspace signal on line 92. AND gate 88, however, has all inputs made and, therefore, the data from the R-register 4 on line 5 is coupled to the appropriate stages of the S-register 26. This is the address at which, during the next cycle, the cursor will be painted and new data, if any, will be painted on the CRT screen and also entered into the Memory 26.

If, during the presence of timing pulse $T_4$, the backspace key has been depressed, the signal on line 100 will SET the backspace F/F 90 and cause an output on line 92. This output will inhibit AND gate 88 through Inverter 94 but will provide an enable for AND gate 86. This signal is also coupled as one input to AND gate 102. Comparator 104 is coupled to the R-register 4 and the S-register 26. When these registers compare, the data in the M-register will represent one character position preceding the address in the S-register 26. This is the address, then, at which the next new character should be stored for the backspace operation. Thus, the output of the comparator 104 on line 106 provides the other input to AND gate 102 which produces an output on line 106 that passes through OR gate 60 and AND gate 62 at time $T_3$ to SET Character Input F/F 70. Thus, when timing pulse $T_4$ is present on line 98, the output of M-register 2 on line 20 is coupled to and stored in the appropriate stages of the S-register 26. This, as explained above, is the address which will cause the new data on the next cycle to be entered into the Memory 16 in the preceding, rather than the succeeding, address. Thus, the backspace is accomplished.

At time $T_5$, the timing pulse on line 108 provides one enable to AND gate 110. If no new character is to be inserted into the Memory 16, the Character Input F/F 70 will not be SET and will be producing an output on line 112 which is also coupled as an enable to AND gate 110. Read Amplifier 114 receives the output of the Memory 16 via line 116 and produces an output on line 118 which passes through AND gate 110 on line 120. This data passes through OR gate 80 to the appropriate stages of the Z-register 82 which produces the output on line 84 which selects the proper character to be generated.

At time $T_6$, the timing signal on line 122 enables AND gate 124 which receives the signal from the Z-register and re-writes it into Memory at the location from which it was taken.

At time $T_7$, the timing signal on line 126 enables AND gate 128 and, if the Character Input F/F 70 is SET, its output on line 72 is used to CLEAR the Backspace register 90, the Sprocket register 46 and all of the data registers 36–42.

At time $T_8$, the timing signal on line 130 clears the Character Input F/F and the next cycle is ready to begin again.

It is understood that suitable modifications may be made in the structure as disclosed provided such modifications come within the spirit and scope of the appended claims.

I claim:

1. An address precession circuit for controlling data insertion into a continuously cycling memory, said circuit comprising:

(a) a counter for sequentially producing pairs of memory address words,
(b) a first data storage register,
(c) means coupled to said counter and said register for gating a particular one of said pair of addresses to said data storage register to be stored therein, and
(d) comparing means coupled to said counter and said first data storage register for causing a memory access signal to be produced when said data in said register compares with the data in said counter.

2. An address precession circuit as in claim 1 wherein said counter comprises:

(a) a second and a third data storage register, for producing first and second memory addresses respectively representing said pair of memory addresses,
(b) means coupling the output of said third register representing said second memory address to said second register at a first time,
(c) an incrementing circuit coupled to said second register for receiving and incrementing said second register output representing said first memory address, and
(d) means coupled to said incrementing means and said third register for storing said incremented memory address word in said third register at a second time.

3. An address precession circuit as in claim 2 wherein said gating means comprises:

(a) means for producing a data storage signal whenever data is to be stored in said memory, and
(b) a first AND gate coupled to said third data register, said first data register and to said data storage signal producing means for coupling the output of said third data register representing said incremented memory address to said first data register when said data storage signal occurs.

4. An address precession circuit as in claim 3 further including:

(a) a backspacing circuit, said circuit comprising:

(1) means for producing a backspacing signal, (2) a second AND gate coupled to said first data register, said second data register, said data storage signal producing means and said backspace signal producing means for coupling the output of said second register to said first data register when said data storage signal and said backspacing signal are present.

References Cited

UNITED STATES PATENTS

| | | | |
|---|---|---|---|
| 3,389,376 | 6/1968 | Packard | 340—172.5 |
| 3,445,818 | 5/1969 | Yen | 340—172.5 |
| 3,453,421 | 7/1969 | Tonnesson | 340—172.5 X |

OTHER REFERENCES

IBM Technical Disclosure Bulletin "Indirect Addressing Arrangement," by F. B. Jones, vol. 4, No. 3, August 1961, pp. 49–50.

PAUL J. HENON, Primary Examiner

PAUL R. WOODS, Assistant Examiner